United States Patent
Jeong et al.

(10) Patent No.: US 12,506,984 B2
(45) Date of Patent: Dec. 23, 2025

(54) IMAGE PROCESSING DEVICE AND IMAGE PROCESSING METHOD

(71) Applicant: SK hynix Inc., Icheon-si (KR)

(72) Inventors: Woo Young Jeong, Icheon-si (KR); Ja Min Koo, Icheon-si (KR); Tae Hyun Kim, Icheon-si (KR); Jae Hwan Jeon, Icheon-si (KR); Chang Hun Cho, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 361 days.

(21) Appl. No.: 18/115,456

(22) Filed: Feb. 28, 2023

(65) Prior Publication Data

US 2024/0098382 A1    Mar. 21, 2024

(30) Foreign Application Priority Data

Sep. 16, 2022    (KR) .......................... 10-2022-0117283

(51) Int. Cl.
*H04N 25/68* (2023.01)
*H04N 25/683* (2023.01)
*H04N 25/704* (2023.01)
*H04N 25/705* (2023.01)

(52) U.S. Cl.
CPC ......... *H04N 25/683* (2023.01); *H04N 25/704* (2023.01); *H04N 25/705* (2023.01)

(58) Field of Classification Search
CPC ... H04N 25/683; H04N 25/704; H04N 25/705
See application file for complete search history.

(56) References Cited

U.S. PATENT DOCUMENTS

2018/0184029 A1* 6/2018 Higuchi ................. H04N 25/47
2021/0012516 A1   1/2021 Kang

FOREIGN PATENT DOCUMENTS

KR    1020140027468 A    3/2014

* cited by examiner

*Primary Examiner* — Lin Ye
*Assistant Examiner* — Fayez A Bhuiyan
(74) *Attorney, Agent, or Firm* — WILLIAM PARK AND ASSOCIATES LTD.

(57) ABSTRACT

An image processing device including: a decision pixel manager for setting a decision area for a defect candidate pixel, and determining a first decision pixel and a second decision pixel, based on first phase information of pixels included in the decision area with respect to a first modulation frequency of a sensing light source among the pixels; a target pixel determiner for calculating a phase difference between the first decision pixel and the second decision pixel, based on second phase information of the pixels with respect to a second modulation frequency of the sensing light source, and determining the defect candidate pixel as a target pixel, corresponding to that the phase difference exceeds a predetermined reference value; and a phase corrector for changing a phase of the target pixel, based on the phase difference.

18 Claims, 9 Drawing Sheets

FIRST MODULATION
FREQUENCY

SECOND MODULATION
FREQUENCY

IMAGE PROCESSING DEVICE AND IMAGE PROCESSING METHOD

CROSS-REFERENCE TO RELATED APPLICATION

The present application claims priority under 35 U.S.C. § 119(a) to Korean patent application number 10-2022-0117283, filed on Sep. 16, 2022, in the Korean Intellectual Property Office, the entire disclosure of which is incorporated herein by reference.

BACKGROUND

1. Technical Field

The present disclosure generally relates to an image processing device, and more particularly, to an image processing device and an image processing method.

2. Related Art

An image sensor may be generally divided into a Charge Coupled Device (CCD) image sensor and a Complementary Metal Oxide Semiconductor (CMOS) image sensor. Recently, the CMOS image sensor which has low manufacturing cost, low power consumption, and easy integration with a peripheral circuit has receive attraction.

An image sensor included in a smartphone, a tablet PC, a digital camera, and the like may convert light reflected from an external object into an electrical signal, thereby acquiring image information on the external object. An image processing device may perform an image processing operation, based on pixel values received from the image sensor.

Depth information may be acquired by using an image sensor, and a Time of Flight (ToF) sensor may be representatively used. The ToF sensor may measure a distance by using irradiated light and reflected light. In depth information measurement, the accuracy of depth information may be lowered due to interference between irradiated light and reflected light. In particular, a phase different from a real phase may be measured in the vicinity of a boundary, and accordingly, a method capable of increasing the accuracy of depth information is required.

SUMMARY

In accordance with an aspect of the present disclosure, there may be provided an image processing device including: a decision pixel manager configured to set a decision area for a defect candidate pixel, and determine a first decision pixel and a second decision pixel, based on first phase information of pixels included in the decision area with respect to a first modulation frequency of a sensing light source among the pixels; a target pixel determiner configured to calculate a phase difference between the first decision pixel and the second decision pixel, based on second phase information of the pixels with respect to a second modulation frequency of the sensing light source, and determine the defect candidate pixel as a target pixel, corresponding to that the phase difference exceeds a predetermined reference value; and a phase corrector configured to change a phase of the target pixel, based on the phase difference.

In accordance with another aspect of the present disclosure, there may be provided an image processing method including: determining at least two decision pixels, based on first phase information of pixels included in a decision area corresponding to a defect candidate pixel with respect to a first modulation frequency of a sensing light source among the pixels; calculating a phase difference between the decision pixels, based on second phase information of the pixels with respect to a second modulation frequency of the sensing light source; determining the defect candidate pixel as a target pixel, corresponding to that the phase difference exceeds a predetermined reference value; and changing a phase of the target pixel, based on the phase difference.

In accordance with still another aspect of the present disclosure, there may be provided an image processing device including: a decision pixel manager configured to detect a first decision pixel and a second decision pixel of which phase is less than a phase of the first decision pixel, based on phases of pixels included in a decision area corresponding to a defect candidate pixel with respect to a first modulation frequency of a sensing light source among the pixels; a target pixel determiner configured to determine the defect candidate pixel as a target pixel, corresponding to that a first phase of the first decision pixel is less than a second phase of the second decision pixel, based on the first phase and the second phase with respect to a second modulation frequency of the sensing light source; and a phase corrector configured to change a phase of the target pixel, based on a difference between the first phase and the second phase.

BRIEF DESCRIPTION OF THE DRAWINGS

Examples of embodiments will now be described more fully hereinafter with reference to the accompanying drawings; however, they may be embodied in different forms and should not be construed as limited to the embodiments set forth herein.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

Various embodiments provide an image processing device and an image processing method, in which a defect pixel of which phase is earlier than a phase of a foreground or is later than a phase of a background is detected at a boundary in image sensing, and the phase of the defect pixel is changed, so that the accuracy of acquired depth information can be improved.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Hereinafter, embodiments of the present disclosure will be described in detail with reference to the accompanying drawings in order for those skilled in the art to be able to readily implement the technical spirit of the present disclosure.

Figure 1:
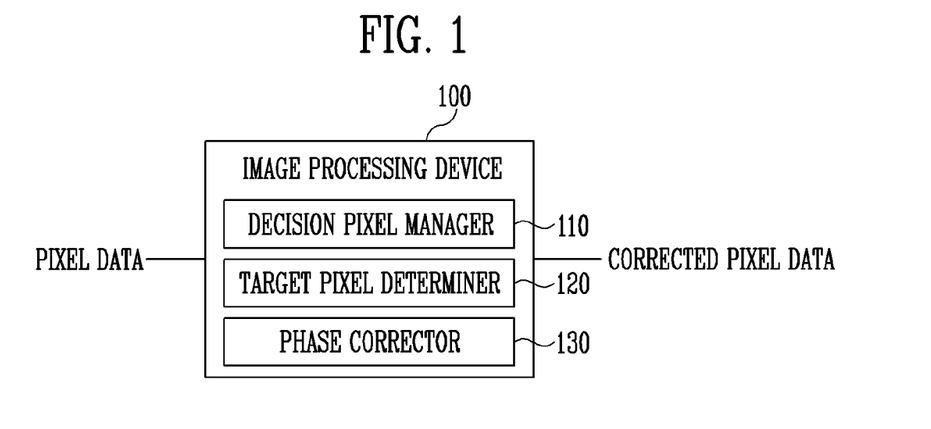
FIG. 1 is a diagram illustrating an image processing device in accordance with an embodiment of the present disclosure.

FIG. 1 is a diagram illustrating an image processing device in accordance with an embodiment of the present disclosure.

Referring to FIG. 1, the image processing device 100 may perform an image processing operation, based on pixel data received from the outside. The image processing device 100 may output corrected pixel data. The image processing device 100 may receive pixel data from an image sensor. In an embodiment of the present disclosure, the image sensor may be a Time of Flight (ToF) sensor. The pixel data may include phase information.

In image sensing, phases of pixels located in the vicinity of a boundary may be erroneously measured. A pixel having a measured phase different from a real phase may be referred to as a defect pixel. In an embodiment, the phase of the defect pixel is corrected, thereby improving the accuracy of depth information. The image processing device 100 may include a decision pixel manager 110, a target pixel determiner 120, and a phase corrector 130.

The decision pixel manager 110 may set a decision area for a defect candidate pixel. The defect candidate pixel may be an arbitrary pixel. The decision pixel manager 110 may determine a first decision pixel and a second decision pixel, based on first phase information of pixels included in the decision area with respect to a first modulation frequency of a sensing light source among pixels.

The decision pixel manager 110 may determine a pixel of which phase is largest among the pixels as the first decision pixel, based on the first phase information. The decision pixel manager 110 may determine a pixel of which phase is smallest among the pixels as the second decision pixel. In an embodiment of the present disclosure, the first decision pixel may be a pixel for a background object, and the second decision pixel may be a pixel for a foreground object.

The decision pixel manager 110 may determine a size of the decision area, based on depth information of the defect candidate pixel. In an embodiment of the present disclosure, a size of a decision area for a boundary portion of an image may be different from a size of a decision area for a portion which is not a boundary.

The target pixel determiner 120 may calculate a phase difference between the first decision pixel and the second decision pixel, based on second phase information of pixels with respect to a second modulation frequency of the sensing light source. The target pixel determiner 120 may determine the defect candidate pixel as a target pixel, corresponding to that the phase difference exceeds a predetermined reference value. The word "predetermined" as used herein with respect to a parameter, such as a predetermined reference value, predetermined angle, predetermined size, or predetermined frequency, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The target pixel determiner 120 may determine the defect candidate pixel as the target pixel, corresponding to that the phase difference is greater than a half cycle. In an embodiment of the present disclosure, the target pixel may be a pixel of which phase is earlier than a phase of a foreground or is later than a phase of a background in the vicinity of a boundary in an image. In an embodiment of the present disclosure, a magnitude and a direction of a pixel signal, which pixel data represents, may be displayed on a complex plane. A distance from a starting point to a pixel displayed on the complex plane may represent the magnitude of the pixel signal. A phase of the pixel displayed on the complex plane may represent the direction of the pixel signal. The half cycle may mean $\pi$ which is a half of $2\pi$, corresponding to that phases of pixels displayed on the complex plane are less than $2\pi$.

In an embodiment of the present disclosure, the second modulation frequency may be greater than the first modulation frequency. In image sensing, a modulation frequency of the sensing light source may be changed. A measurement distance of the image sensor may vary according to the modulation frequency. As the modulation frequency becomes larger; the measurement distance of the image sensor may become shorter. A phase of the first decision pixel and a phase of the second decision pixel may vary according to the modulation frequency of the sensing light source. Although the foreground object and the background object are the same, a measured phase may vary according to the modulation frequency of the sensing light source.

The phase corrector 130 may change a phase of the target pixel, based on the phase difference. The phase corrector 130 may change the phase of the target pixel with respect to the second modulation frequency to be less than the phase of the first decision pixel and to be greater than the phase of the second decision pixel. In an embodiment of the present disclosure, the phase corrector 130 may increase the phase of the target pixel by a half cycle or more.

In another embodiment of the present disclosure, the decision pixel manager 110 may determine a first decision pixel and a second decision pixel of which phase is less than a phase of the first decision pixel, based on phases of pixels included in a decision area corresponding to the defect candidate pixel with respect to the first modulation frequency of the sensing light source among pixels. The decision pixel manager 110 may determine pixels having the largest phase difference with respect to the first modulation frequency among the pixels as the first decision pixel and the second decision pixel. For example, the decision pixel manager 110 may determine a pixel of which phase is largest phase among the pixels as the first decision pixel, and determine a pixel having the smallest phase among the pixels as the second decision pixel.

Based on a first phase of the first decision pixel and a second phase of the second decision pixel with respect to the second modulation frequency of the sensing light source, the target pixel determiner 120 may determine the defect candidate pixel as a target pixel, corresponding to that the first phase is less than the second phase. The target pixel determiner 120 may determine the defect candidate pixel as the target pixel, corresponding to that a magnitude of the phase difference between the first decision pixel and the second decision pixel is less than a half cycle. A difference between the first phase and the second phase may be a negative number. The phase corrector 130 may change a phase of the target pixel with respect to the second modulation frequency to be less than the first phase and to be greater than the second phase. The phase corrector 130 may calculate a corrected phase, based on the difference between the first phase and the second phase. The phase corrector 130 may increase the phase of the target pixel by the corrected phase.

Figure 2:
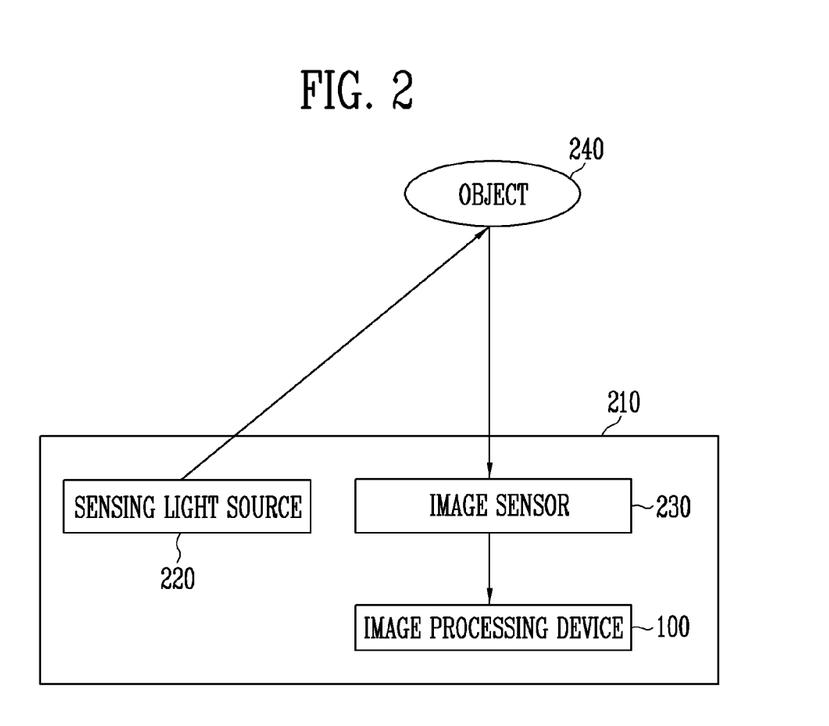
FIG. 2 is a diagram illustrating an image sensing method in accordance with an embodiment of the present disclosure.

FIG. 2 is a diagram illustrating an image sensing method in accordance with an embodiment of the present disclosure.

Referring to FIG. 2, an image system 210 may sense an object 240. The image system 210 may include a sensing light source 220, an image sensor 230, and an image processing device 100. The image system 210 may measure a distance from the object 240 by irradiating light and receiving reflected light. The image system 210 may generate depth information of an image, based on the measured distance.

The sensing light source 220 may irradiate light. The sensing light source 220 may be a Vertical Cavity Surface Emitting Laser (VCSEL), a Laser Diode (LD) or Light Emitting Diode (LED), a Near Infrared Laser (NIR), a point light source, a monochromatic illumination source in which a white lamp and a monochromator are combined, or a combination of other laser light sources, which emits light (e.g., near infrared light, ultraviolet light, or visible light) having a specific wavelength band. For example, the sensing light source 220 may emit infrared light having a wavelength of 800 nm to 1000 nm.

The sensing light source 220 may change a modulation frequency of light irradiated therefrom. The light irradiated from the sensing light source 220 may be modulated light modulated at a predetermined frequency.

The image sensor 230 may receive reflected light. The image sensor 230 may include a pixel array in which a plurality of pixels are arranged. The plurality of pixels may generate pixel signals obtained by converting received light into an electrical signal corresponding to an intensity of the received light. The image sensor 230 may generate pixel data including the pixel signals. The image sensor 230 may transmit the pixel data to the image processing device 100.

In an embodiment of the present disclosure, the image sensor 230 may be a ToF sensor. The ToF sensor may measure a distance by using a phase difference between light irradiated from the sensing light source 220 and light which is reflected from the object 240 and then received.

The image processing device 100 may detect a defect pixel, based on the received pixel data, and correct a phase of the defect pixel. Interference between received lights may occur at a boundary of an image. Phases of pixels may be erroneously measured due to the interference between the lights. The image processing device 100 may correct the erroneously measured phases of the pixels. In an embodiment of the present disclosure, the defect pixel may be a pixel of which phase is erroneously measured, FIG. 3 is a diagram illustrating a flying pixel which may occur between a foreground object and a background object in accordance with an embodiment of the present disclosure.

Figure 3:
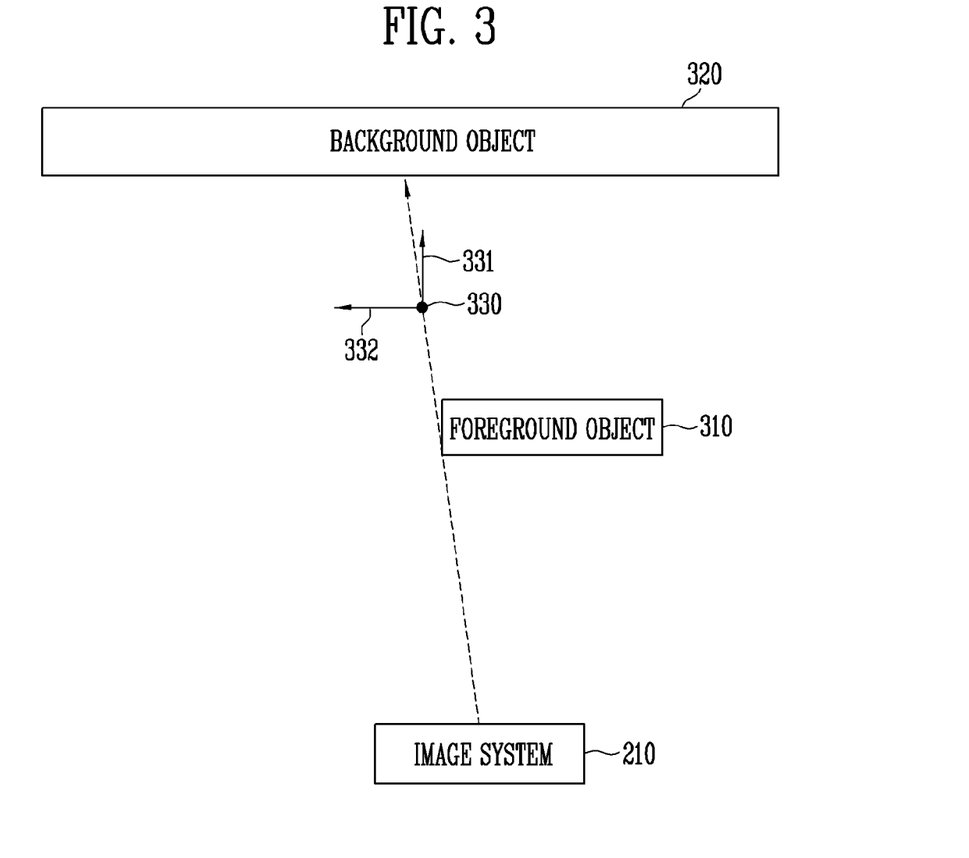
FIG. 3 is a diagram illustrating a flying pixel which may occur between a foreground object and a background object in accordance with an embodiment of the present disclosure.

Referring to FIG. 3, the image system 210 may sense a foreground object 310 and a background object 320, which have different distances from the image system 210. The image system 210 may receive lights reflected from objects, and generate depth information, based on the received lights. Interference may occur between lights reflected from objects having different distances from the image system 210. A phase of a specific pixel is erroneously measured due to the interference between the received lights, and therefore, the accuracy of depth information may be decreased.

In FIG. 3, a flying pixel 330 located in the vicinity of a boundary of the foreground object 310 and the background object 320 may be illustrated. The flying pixel 330 may look as if the flying pixel 300 flows between the foreground object 310 and the background object 320 due to a mixture of light reflected from the foreground object 310 and light reflected from the background object 320. A three-dimensional depth of the flying pixel 330 in a sensed image may be measured between the foreground object 310 and the background object 320. An object which does not exist between the foreground object 310 and the background object 320 may be sensed by the flying pixel 330. The accuracy of depth information generated by the image system 210 may be lowered.

A viewing vector 331 of the flying pixel 330 may form an angle of 90 degrees with a normal vector 322 of a plane formed by peripheral pixels in the image. The image system 210 may detect flying pixels included in the image, based on the angle between the viewing vector 331 and the normal vector 332. In an embodiment, the image system 210 can improve the accuracy of depth information by correcting pixel values of the detected flying pixels. A method in which the image system 210 corrects the pixel values of the flying pixels is technical contents already known in the art. Therefore, in this specification, descriptions of the method in which the image system 210 corrects the pixel values of the flying pixels will be omitted.

Figure 4:
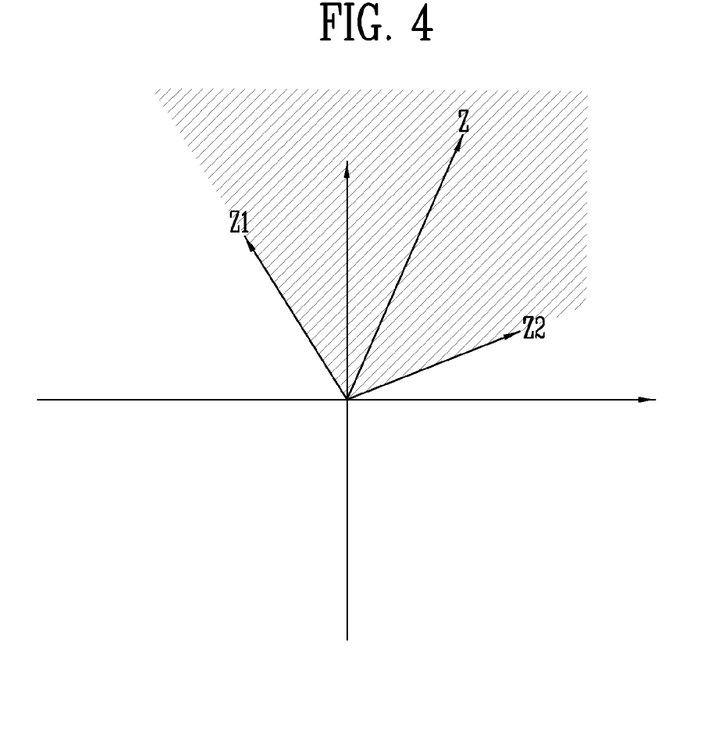
FIG. 4 is a diagram illustrating phases of a foreground, a background, and a flying pixel in accordance with an embodiment of the present disclosure.

FIG. 4 is a diagram illustrating phases of a foreground, a background, and a flying pixel in accordance with an embodiment of the present disclosure.

Referring to FIG. 4, reflected light Z1 of a background object, reflected light Z2 of a foreground object, and received light Z of a boundary pixel may be illustrated on a coordinate plane. The received light Z of the boundary pixel may be located between the reflected light Z1 of the background object and the reflected light Z2 of the foreground object. A phase of the reflected light Z1 of the background object may be greater than a phase of the reflected light Z2 of the foreground object.

A pixel value of a flying pixel may be represented as a virtual object located between the background object and the foreground object. Therefore, a boundary pixel in which a phase of the received light Z is less than the phase of the reflected light Z1 of the background object and is greater than the phase of the reflected light Z2 of the foreground object may be referred to as the flying pixel. In an embodiment of the present disclosure, the received light Z of the boundary pixel may be a vector sum of the reflected light Z1 of the background object and the reflected light Z2 of the foreground object. In FIG. 4, received light of the flying pixel may be located inside a slashed area, FIG. 5 is a diagram illustrating phase correction of an inverse flying pixel in accordance with an embodiment of the present disclosure.

Figure 5:
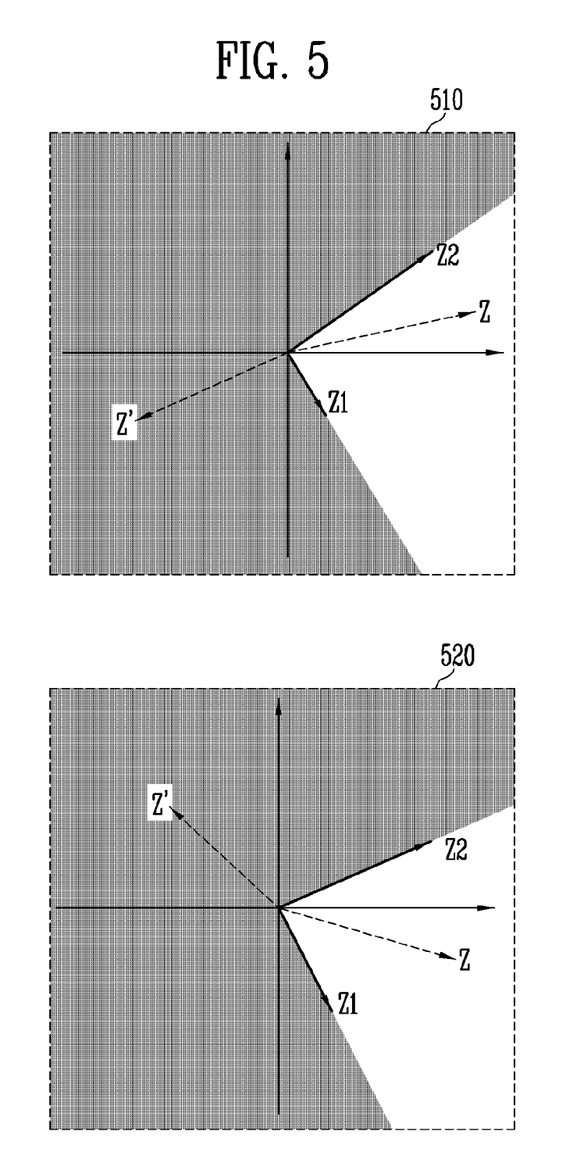
FIG. 5 is a diagram illustrating phase correction of an inverse flying pixel in accordance with an embodiment of the present disclosure.

Referring to FIG. 5, cases 510 and 520 where a phase difference between the reflected light Z1 of the background object and the reflected light Z2 of the foreground object is greater than a half cycle may be illustrated. In FIG. 5, a case 510 where the phase of the received light Z of the boundary pixel is less than the phase of the reflected light Z2 of the foreground object and a case 520 where the phase of the received light Z of the boundary pixel is greater than the phase of the reflected light Z1 of the background object may be illustrated.

In the case 510 where the phase of the received light Z of the boundary pixel is less than the phase of the reflected light Z2 of the foreground object, a pixel value of the boundary pixel may represent a first virtual object closer to the image system than the foreground object. In the case 520 where the phase of the received light Z of the boundary pixel is greater than the phase of the reflected light Z1 of the background object, a pixel value of the boundary pixel may represent a second virtual object more distant from the image system than the background object.

In an embodiment of the present disclosure, a boundary pixel in which the phase of the received light Z is greater than the phase of the reflected light Z1 of the background object or is less than the phase of the reflected light Z2 of the foreground object may be referred to as an inverse flying pixel. A phase of reflected light of the inverse flying pixel might not be common with a phase of reflected light of the flying pixel.

A viewing vector of the inverse flying pixel does not form the angle of 90 degrees with the plane formed by the peripheral pixels, and therefore, the inverse flying pixel is not detected by using the existing flying pixel detection method. When a pixel value of the inverse flying pixel is maintained, depth information on a virtual object which does not exist may be generated, and therefore, it is necessary to correct the pixel value of the inverse flying pixel.

In an embodiment of the present disclosure, the image processing device may detect an inverse flying pixel, based on received pixel data. The image processing device may change a phase of the detected inverse flying pixel such that the inverse flying pixel can be detected by the existing flying pixel detection method.

The phase of the flying pixel may be greater than the phase of the reflected light Z2 of the foreground object and be less than the phase of the reflected light Z1 of the background object. In FIG. 5, a shadow area on the coordinate plane may represent an area in which received light of the flying pixel can be located. The image processing device may determine whether the boundary pixel is an inverse flying pixel, based on the phase of the reflected light Z1 of the background object and the phase of the reflected light Z2 of the foreground object, and change the phase of the received light Z of the boundary pixel, corresponding to that the boundary pixel is the inverse flying pixel. Specifically, the image processing device may change a phase of received light of the inverse flying pixel to be less than the phase of the reflected light Z1 of the background object and to be greater than the phase of the reflected light Z2 of the foreground object.

Corrected received light Z' may be located in the area (i.e., the shadow area shown in FIG. 5) in which the received light of the flying pixel can be located. The corrected received light Z' shown in FIG. 5 is merely an embodiment, and may be corrected to be located in the shadow area shown in FIG. 5.

The image processing device may correct the inverse flying pixel as the flying pixel by changing the phase of the received light Z of the boundary pixel. The image processing device may detect flying pixels included in an image by using the existing flying pixel correction method, and correct pixel values of the detected flying pixels. In an embodiment, the image processing device corrects pixel data including pixel values of the inverse flying pixels and the flying pixels, so that the accuracy of depth information on the image can be improved.

Figure 6:
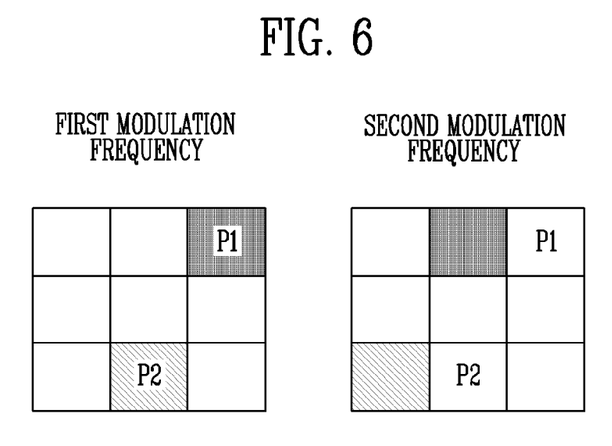
FIG. 6 is a diagram illustrating a phase difference of a decision area and decision pixels in accordance with an embodiment of the present disclosure.

FIG. 6 is a diagram illustrating a phase difference of a decision area and decision pixels in accordance with an embodiment of the present disclosure.

Referring to FIG. 6, a decision area corresponding to a defect candidate pixel may be illustrated. Phases of pixels included in the decision area may vary according to the modulation frequency of the sensing light source. In FIG. 6, decision areas which have a size of 3×3 and correspond to the first modulation frequency and the second modulation frequency may be illustrated. A shadowed pixel in the decision area may be a pixel of which phase is largest among pixels included in the decision area, and a slashed pixel in the decision area may be a pixel of which phase is smallest among the pixels included in the decision area. A pixel located at the center of the decision area may be a defect candidate pixel.

The decision pixel manager may determine decision pixels, based on first phase information of pixels with respect to the first modulation frequency of the sensing light source included in the decision area among the pixels. The first phase information may be information on a phase of each of the pixels included in the decision area.

In an embodiment of the present disclosure, the decision area may be a pixel area having a predetermined size, in which the defect candidate pixel is located at the center thereof. The size of the decision area may vary according to depth information of the defect candidate pixel. The defect candidate pixel may be a pixel located in the vicinity of a boundary included in an image.

The decision pixel manager may determine, as a first decision pixel P1, a pixel of which phase corresponding to the first modulation frequency is largest among the pixels included in the decision area. The decision pixel manager may determine, as a second decision pixel P2, a pixel of which phase corresponding to the first modulation frequency is smallest among the pixels included in the decision area. In another embodiment of the present disclosure, the decision pixel manager may determine, as the first decision pixel P1 and the second decision pixel P2, two pixels having the largest phase difference among the pixels included in the decision area.

In an embodiment of the present disclosure, the first decision pixel P1 may be a background pixel, and the second decision pixel P2 may be a foreground pixel. A phase of the first decision pixel P1 with respect to the first modulation frequency may be a phase of reflected light of a background object, and a phase of the second decision pixel P2 with respect to the first modulation frequency may be a phase of reflected light of a foreground object.

In an embodiment of the present disclosure, the first modulation frequency may be greater than the second modulation frequency. As the modulation frequency of the sensing light source becomes larger, a measurement distance may become larger. The sensing light source may irradiate light corresponding to the first modulation frequency and then irradiate light corresponding to the second modulation frequency.

The target pixel determiner may calculate a phase difference between the first decision pixel P1 and the second decision pixel P2, based on second phase information on the second modulation frequency. In an embodiment of the present disclosure, the first decision pixel P1 and the second decision pixel P2 may be determined based on the first phase information. Therefore, although the phases of the pixels included in the decision area with respect to the second modulation frequency vary, the first decision pixel P1 and the second decision pixel P2 might not be changed. In FIG. 6, the phase of the first decision pixel P1 with respect to the second modulation frequency might not be largest among the phases of the pixels included in the decision area. Similarly, the phase of the second decision pixel P2 with respect to the second modulation frequency might not be smallest among the phases of the pixels included in the decision area.

The target pixel determiner may determine the defect candidate pixel as a target pixel, corresponding to that the phase difference between the first decision pixel P1 and the second decision pixel P2 is greater than a half cycle. In an embodiment of the present disclosure, the target pixel may be an inverse flying pixel.

The phase corrector may change a phase of the target pixel with respect to the second modulation frequency to be less than the phase of the first decision pixel P1 and to be larger than the phase of the second decision pixel P2. In an embodiment of the present disclosure, the phase corrector may correct the inverse flying pixel as a flying pixel.

Figure 7:
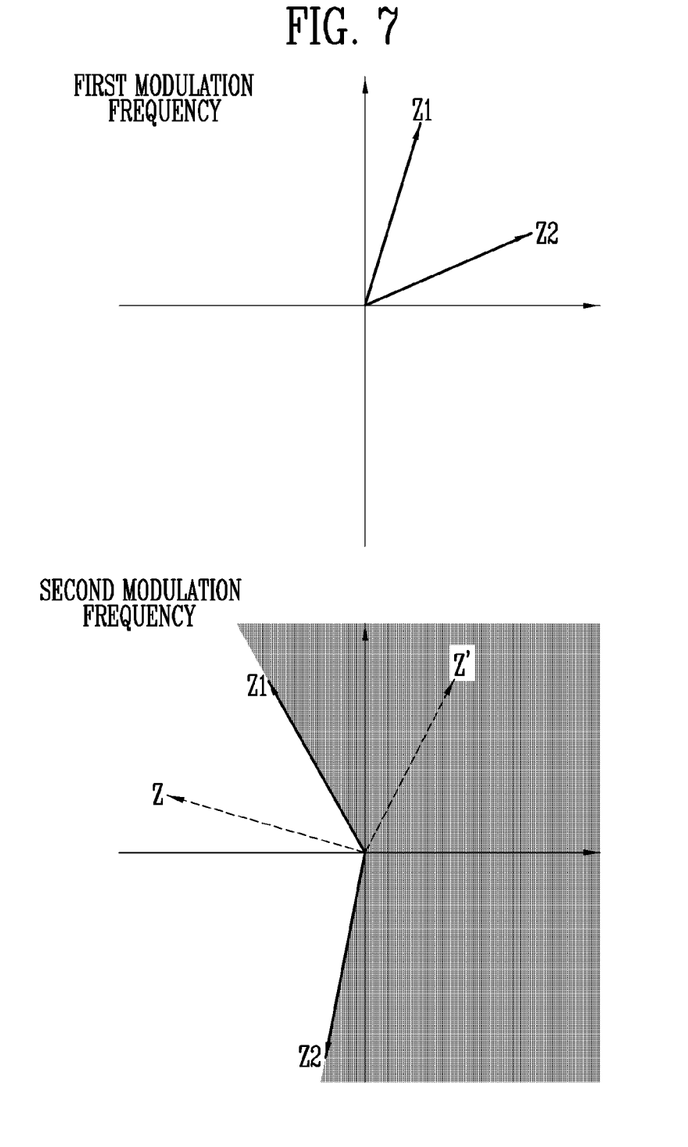
FIG. 7 is a diagram illustrating a phase of a target pixel and a phase change method in accordance with an embodiment of the present disclosure.

FIG. 7 is a diagram illustrating a phase of a target pixel and a phase change method in accordance with an embodiment of the present disclosure.

Referring to FIG. 7, a case where a relationship between the phase of the reflected light Z1 of the background object and the phase of the reflected light Z2 of the foreground object is reversed according to a modulation frequency change of the sensing light source may be illustrated. The phase of the received light Z of the boundary pixel may become greater than the phase of the reflected light Z1 of the background object or become less than the phase of the reflected light Z2 of the foreground object.

In FIG. 7, the reflected light Z1 of the background object may be received light of the first decision pixel P1 shown in FIG. 6. Similarly, the reflected light Z2 of the foreground object may be received light of the second decision pixel P2 shown in FIG. 6.

A modulation frequency of light irradiated from the sensing light source may be changed. The phases of the pixels included in the decision area may be changed according to a change in the modulation frequency. Because a sensing distance becomes larger as the modulation frequency becomes smaller, the phases of the pixels with respect to the second modulation frequency greater than the first modulation frequency may exceed one cycle. For example, the phase of the reflected light Z1 of the background object with respect to the first modulation frequency is greater than the phase of the reflected light Z2 of the foreground object with respect to the first modulation frequency, but a first phase as the phase of the reflected light Z1 of the background object with respect to the second modulation frequency may be less than a second phase as the phase of the reflected light Z2 of the foreground object with respect to the second modulation frequency.

In another embodiment of the present disclosure, the target pixel determiner may determine the defect candidate pixel as a target pixel, corresponding to that the phase difference between the first decision pixel P1 and the second decision pixel P2 is a negative number. The magnitude of the phase difference between the first decision pixel P1 and the second decision pixel P2 may be less than a half cycle. The target pixel determiner may determine the defect candidate pixel as the target pixel, corresponding to that the first phase with respect to the second modulation frequency of the sensing light source is less than the second phase with respect to the second modulation frequency of the sensing light source. The magnitude of a difference between the first phase and the second phase may be less than a half cycle.

In FIG. 7, the received light Z of the boundary pixel with respect to the second modulation frequency, of which phase is greater than the phase of the reflected light Z1 of the background object, may be illustrated. Because the phase of the received light Z of the boundary pixel is greater than the first phase, the boundary pixel may be an inverse flying pixel. The target pixel determiner may determine the defect candidate pixel as the target pixel.

The phase corrector may change a phase of the target pixel with respect to the second modulation frequency to be less than the phase of the first decision pixel P1 and to be greater than the phase of the second decision pixel P2. In an embodiment of the present disclosure, the phase corrector may correct the phase of the received light Z of the boundary pixel to be earlier than the phase of the reflected light Z1 of the background object or to be later than the phase of the reflected light Z2 of the foreground object. A shadow area shown in FIG. 7 may represent an area in which corrected received light Z' can be located. A phase of the corrected received light Z' may be less than the first phase and be greater than the second phase. In an embodiment of the present disclosure, the phase of the corrected received light Z' may be determined based on a difference between the first phase and the second phase.

Figure 8:
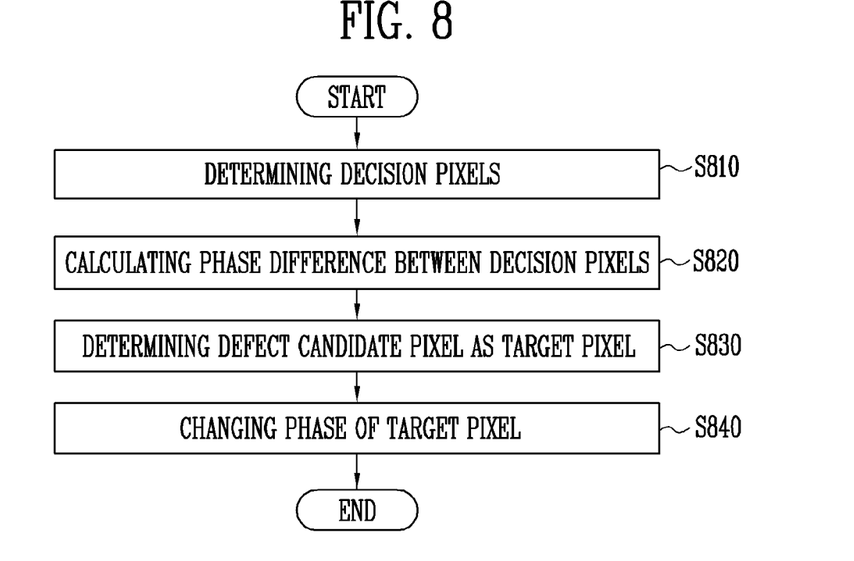
FIG. 8 is a flowchart illustrating a method of changing a phase of a target pixel in accordance with an embodiment of the present disclosure.

FIG. 8 is a flowchart illustrating a method of changing a phase of a target pixel in accordance with an embodiment of the present disclosure.

Referring to FIG. 8, the image processing device may detect an inverse flying pixel which is not detected by using the flying pixel detection method, and correct a phase of the inverse flying pixel. The image processing device corrects the phase of the inverse flying pixel, so that a correction operation on an image can be performed by using the flying pixel detection method.

In step S810, the decision pixel manager may determine at least two decision pixels, based on first phase information of pixels with respect to the first modulation frequency of the sensing light source included in a decision area corresponding to a defect candidate pixel among pixels. In an embodiment of the present disclosure, the decision pixel manager may determine two pixels having the largest phase difference as decision pixels, based on the first phase information.

In step S820, the target pixel determiner may calculate a phase difference of the decision pixels, based on second phase information of the pixels included in the decision area with respect to the second modulation frequency of the sensing light source. Phases of the pixels with respect to the second modulation frequency may be different from phases of the pixels with respect to the first modulation frequency. Although the phases of the pixels included in the decision area are changed, phases of the decision pixels might not be changed.

In step S830, the target pixel determiner may determine the defect candidate pixel as a target pixel, corresponding to that the phase difference exceeds a predetermined reference value. The target pixel determiner may determine the defect candidate pixel as the target pixel, corresponding to that the phase difference between the decision pixels is greater than a half cycle. In an embodiment of the present disclosure, the target pixel may be an inverse flying pixel.

In step S840, the phase corrector may change a phase of the target pixel, based on the phase difference between decision pixels. The phase corrector may change the phase of the target pixel with respect to the second modulation frequency to be less than the phase of the reflected light of the background object and to be greater than the phase of the reflected light of the foreground object. The phase corrector corrects the phase of the target pixel, so that the target pixel can be changed to a flying pixel. A viewing vector of the target pixel of which phase is corrected may form a predetermined angle with a normal vector of a plane formed by peripheral pixels.

Figure 9:
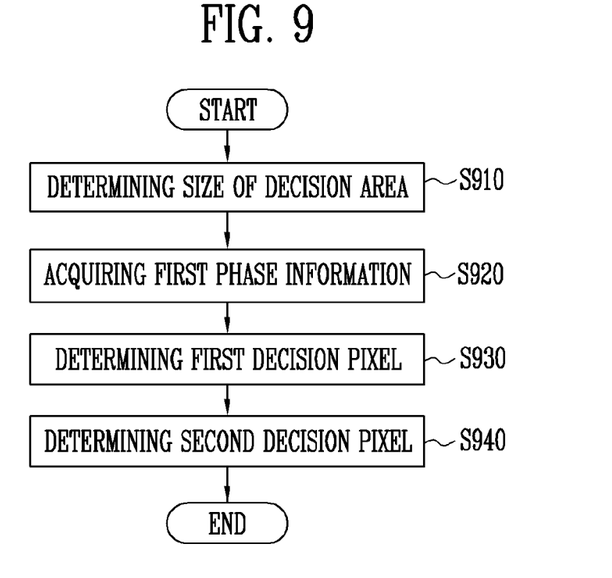
FIG. 9 is a flowchart illustrating a method of determining decision pixels in accordance with an embodiment of the present disclosure.

FIG. 9 is a flowchart illustrating a method of determining decision pixels in accordance with an embodiment of the present disclosure.

Referring to FIG. 9, the decision pixel manager may determine at least two decision pixels corresponding to a defect candidate pixel. The decision pixel manager may determine decision pixels by using first phase do information on the first modulation frequency.

In step S910, the decision pixel manager may set a decision area corresponding to a defect candidate pixel. The decision pixel manager may determine a size of the decision area, based on depth information of the defect candidate pixel. The decision pixel manager may generate a decision area corresponding to the determined size.

In an embodiment of the present disclosure, the decision pixel manager may generate a first decision area corresponding to the first modulation frequency of the sensing light source and a second decision area corresponding to the second modulation frequency of the sensing light source. Sizes of the first decision area and the second decision area may be the same. The size of the decision area may be 3×3 or 5×15.

In step S920, the decision pixel manager may acquire first phase information corresponding to the first modulation frequency of the sensing light source. The first phase information may represent a phase of each of pixels included in the decision area. The phases of the pixels included in the decision area may be different from each other.

In step S930, the decision pixel manager may determine, as a first decision pixel, a pixel of which phase is largest among the pixels included in the decision area, based on the first phase information. In step S940, the decision pixel manager may determine, as a second decision pixel, a pixel of which phase is smallest among the pixels included in the decision area, based on the first phase information. A phase difference between the first decision pixel and the second decision pixel may be largest among phase differences between the other pixels included in the decision area.

Figure 10:
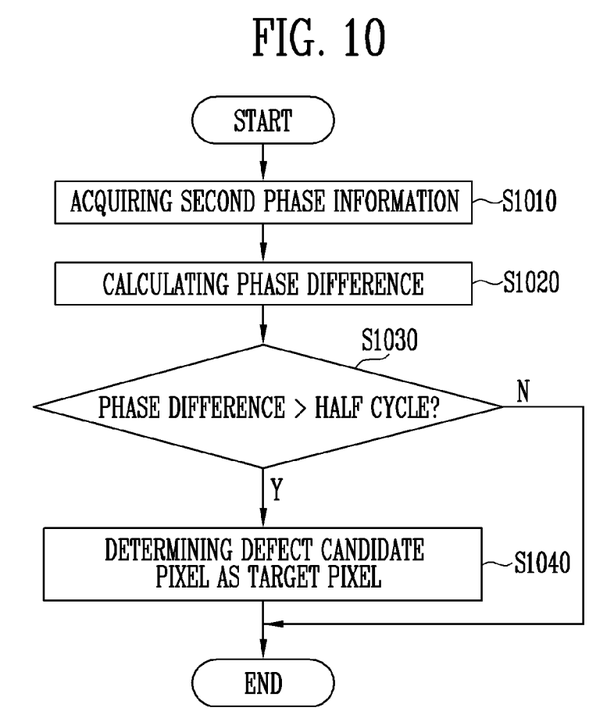
FIG. 10 is a flowchart illustrating a method of a defect candidate pixel as a target pixel in accordance with an embodiment of the present disclosure.

FIG. 10 is a flowchart illustrating a method of a defect candidate pixel as a target pixel in accordance with an embodiment of the present disclosure.

Referring to FIG. 10, the target pixel determiner may determine a defect candidate pixel as a target pixel according to a phase difference between decision pixels with respect to the second modulation frequency. In an embodiment of the present disclosure, the target pixel may be an inverse flying pixel. The second modulation frequency has a sensing distance smaller than a sensing distance of the first modulation frequency.

In step 1010, the target pixel determiner may acquire second phase information on the second modulation frequency greater than the first modulation frequency. The second phase information may represent a phase of each of pixels included in a decision area with respect to the second modulation frequency. The phases of the pixels included in the decision area may vary according to a change in modulation frequency. In spite of the change in modulation frequency, the first decision pixel and the second decision pixel, which are determined based on the first phase information, might not be changed.

In step S1020, the target pixel determiner may calculate a phase difference between the first decision pixel and the second decision pixel with respect to the second modulation frequency. In an embodiment of the present disclosure, the phase of the first decision pixel with respect to the second modulation frequency might not be the largest value among the phases of the pixels included in the decision area. Similarly, the phase of the second decision pixel with respect to the second modulation frequency might not be the smallest value among the phases of the pixels included in the decision area.

In step S1030, the target pixel determiner may decide whether the phase difference between the first decision pixel and the second decision pixel exceeds a half cycle. The target pixel determiner may determine that a defect candidate pixel is not a target pixel, corresponding to that the phase difference between the first decision pixel and the second decision pixel is less than or equal to the half cycle.

In step S1040, the target pixel determiner may determine that the defect candidate pixel as the target pixel, corresponding to that the phase difference between the first decision pixel and the second decision pixel exceeds the half cycle. A phase of the target pixel may be changed by a determined corrected phase according to the phase difference.

In an embodiment of the present disclosure, an image may include a plurality of defect candidate pixels. The target pixel determiner may determine a plurality of target pixels with respect to the plurality of defect candidate pixels. The plurality of target pixels may form a target pixel set.

Figure 11:
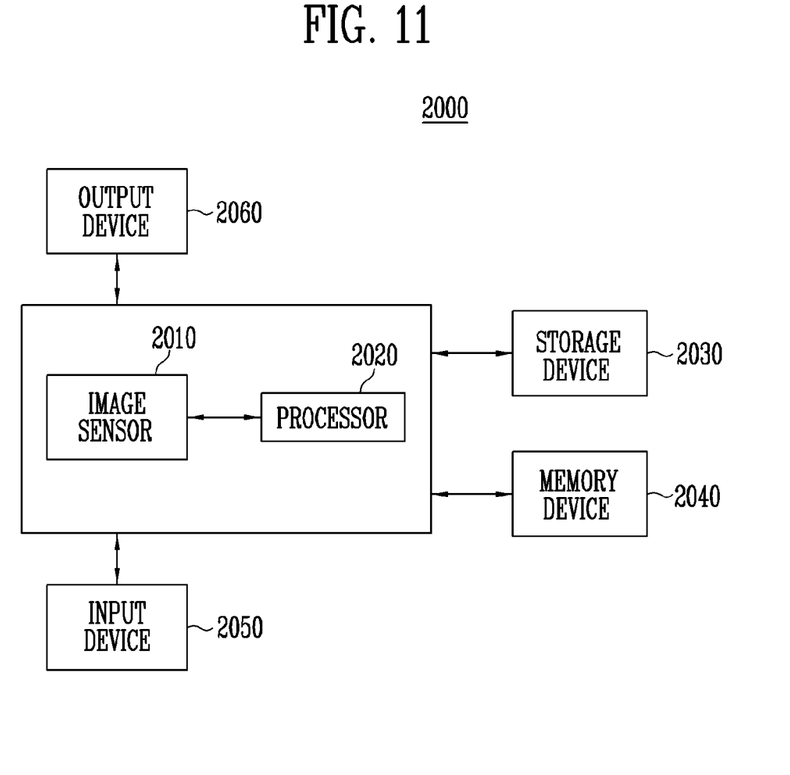
FIG. 11 is a block diagram illustrating an electronic device including an image processing device in accordance with an embodiment of the present disclosure.

FIG. 11 is a block diagram illustrating an electronic device including an image processing device in accordance with an embodiment of the present disclosure.

Referring to FIG. 11, the electronic device 2000 may include an image sensor 2010, a processor 2020, a storage device 2030, a memory device 2040, an input device 2050, and an output device 2060. Although not shown in FIG. 11, the electronic device 2000 may communicate with a video card, a sound card, a memory card, a USB device, and the like, or further include ports capable of communicating with other electronic devices.

The image sensor 2010 may generate image data corresponding to incident light. The image data may be transferred to the processor 2020 to be processed by the processor 2020. The output device 2060 may display the image data. The storage device 2030 may store the image data. The processor 2020 may control operations of the image sensor 2010, the output device 2060, and the storage device 2030.

The processor 2020 may be an image processing device which performs a calculation of processing image data received from the image sensor 2010 and outputs the processed image data. The processing may be Electronic Image Stabilization (EIS), interpolation, color tone correction, image quality correction, size adjustment, or the like.

The processor 2020 may be implemented as a chip independent from the image sensor 2010. For example, the processor 2020 may be implemented with a multi-chip package. In another embodiment of the present disclosure, the processor 2020 may be included as a portion of the image sensor 2010 to be implemented as one chip.

The processor 2020 may execute and control an operation of the electronic device 2000. In accordance with an embodiment of the present disclosure, the processor 2020 may be a microprocessor, a Central Processing Unit (CPU), or an Application Processor (AP). The processor 2020 may be connected to the storage device 2030, the memory device 2040, the input device 2050, and the output device 2060 through an address bus, a control bus, and a data bus, to perform communication.

In an embodiment of the present disclosure, the processor 2020 may detect a defect pixel of which phase is erroneously measured at a boundary of an image. The processor 2020 may set a decision area for a defect candidate pixel, and determine decision pixels among pixels included in the decision area. The processor 2020 may determine a first decision pixel and a second decision pixel of which phase is less than a phase of the first decision pixel, based on first phase information of the pixels with respect to a first modulation frequency of a sensing light source. The processor 2020 may calculate a phase difference between the first decision pixel and the second decision pixel, based on second phase information of the pixels with respect to a second modulation frequency of the sensing light source. The processor 2020 may determine the defect candidate pixel as a target pixel, corresponding to that the phase difference is greater than a half cycle. The processor 2020 may change a phase of the target pixel, based on the phase difference between the first decision pixel and the second decision pixel. The processor 2020 may change the phase of the target pixel with respect to the second modulation frequency to be less than the phase of the first decision pixel and to be greater than the phase of the second decision pixel.

The storage device 2030 may include a flash memory device, a Solid State Drive (SSD), a Hard Disk Drive (HDD), a CD-ROM, all types of nonvolatile memory devices, and the like.

The memory device 2040 may store data necessary for an operation of the electronic device 2000. For example, the memory device 2040 may include a volatile memory device such as a Dynamic Random Access Memory (DRAM) or a Static Random Access Memory (SRAM) and a nonvolatile memory device such as an Erasable Programmable Read-Only Memory (EPROM), an Electrically Erasable Programmable Read-Only Memory (EEPROM), or a flash memory device. The processor 2020 may control the image sensor 2010 and the output device 2060 by executing a command set stored in the memory device 2040.

The input device 2050 may include an input means such as a keyboard, a keypad, or a mouse, and the output device 2060 may include an output means such as a printer or a display.

The image sensor 2010 may be implemented with various types of packages. For example, components of at least a portion of the image sensor 2010 may be implemented by using packages such as Package-on-Package (PoP), Ball Grid Arrays (BGAs), Chip Scale Packages (CSPs), Plastic Leaded Chip Carrier (PLCO), Plastic Dual In-line Package (PDIP), Die in Waffle Pack, Die in Wafer Form, Chip-On-Board (COB), CERamic Dual In-line Package (CERDIP), Plastic Metric Quad Flat Pack (MQFP), Thin Quad Flat Pack (TQFP), Small Outline (SOIC), Shrink Small Outline Package (SSOP), Thin Small Outline (TSOP), System In Package (SIP), Multi-Chip Package (MCP), Wafer-level Fabricated Package (WFP), Wafer-level Processed Stack Package (WSP), and Wafer-level Processed Package (WSP).

Meanwhile, the electronic device 2000 may be interpreted as all computing systems using the image sensor 2010. The electronic device 2000 may be implemented in the form of a packaged module, a component, or the like. For example, the electronic device 2000 may be implemented as a digital camera, a mobile device, a smart phone, a Personal Computer (PC), a tablet PC, a notebook computer, a Personal Digital Assistant (PDA), an Enterprise Digital Assistant (EDA), a Portable Multimedia Player (PMP), a wearable device, a black box, a robot, an autonomous vehicle, or the like.

In accordance with the present disclosure, there can be provided an image processing device and an image processing method, which can correct an error of a phase measurement result, which may occur due to interference between irradiated light and reflected light.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. An image processing device comprising:
a decision pixel manager configured to set a decision area for a defect candidate pixel, and determine a first decision pixel and a second decision pixel, based on first phase information of pixels included in the decision area with respect to a first modulation frequency of a sensing light source among the pixels;
a target pixel determiner configured to calculate a phase difference between the first decision pixel and the second decision pixel, based on second phase information of the pixels with respect to a second modulation frequency of the sensing light source, and determine the defect candidate pixel as a target pixel, corresponding to that the phase difference exceeds a predetermined reference value; and a phase corrector configured to change a phase of the target pixel, based on the phase difference, wherein the second modulation frequency is greater than the first modulation frequency, and wherein phases of the first decision pixel and the second decision pixel vary according to a modulation frequency of the sensing light source.

2. The image processing device of claim 1, wherein the decision pixel manager determines, as the first decision pixel, a pixel of which phase is largest among the pixels, based on the first phase information, and determines, as the second decision pixel, a pixel of which phase is smallest among the pixels, based on the first phase information.

3. The image processing device of claim 1, wherein the decision pixel manager determines a size of the decision area, based on depth information of the defect candidate pixel.

4. The image processing device of claim 1, wherein the target pixel determiner determines the defect candidate pixel as the target pixel, corresponding to that the phase difference is greater than a half cycle, and wherein the half cycle represents TT which is a half of $2\pi$, corresponding to that phases of pixels displayed on a complex plane are less than $2\pi$.

5. The image processing device of claim 1, wherein the phase corrector changes a phase of the target pixel with respect to the second modulation frequency to be less than a phase of the first decision pixel and to be greater than a phase of the second decision pixel.

6. The image processing device of claim 1, wherein the phase corrector increases the phase of the target pixel by a half cycle or more.

7. An image processing method comprising:
determining at least two decision pixels, based on first phase information of pixels included in a decision area corresponding to a defect candidate pixel with respect to a first modulation frequency of a sensing light source among the pixels;
calculating a phase difference between the decision pixels, based on second phase information of the pixels with respect to a second modulation frequency of the sensing light source;
determining the defect candidate pixel as a target pixel, corresponding to that the phase difference exceeds a predetermined reference value; and
changing a phase of the target pixel, based on the phase difference,
wherein the second modulation frequency is greater than the first modulation frequency, and
wherein phases of the decision pixels vary according to a modulation frequency of the sensing light source.

8. The image processing method of claim 7, wherein the determining of the decision pixels includes:
determining, as a first decision pixel, a pixel of which phase is largest among the pixels, based on the first phase information; and
determining, as a second decision pixel, a pixel of which phase is smallest among the pixels, based on the first phase information.

9. The image processing method of claim 7, wherein the determining of the decision pixels includes:
determining a size of the decision area, based on depth information of the defect candidate pixel; and
generating the decision area corresponding to the size.

10. The image processing method of claim 8, wherein the calculating of the phase difference between the decision pixels includes:
acquiring the second phase information on the second modulation frequency; and
calculating a phase difference between the first decision pixel and the second decision pixel with respect to the second modulation frequency.

11. The image processing method of claim 8, wherein the determining of the defect candidate pixel as the target pixel includes determining the defect candidate pixel as the target pixel, corresponding to that the phase difference between the first decision pixel and the second decision pixel exceeds a half cycle, and wherein the half cycle represents TT which is a half of $2\pi$, corresponding to that phases of pixels displayed on a complex plane are less than 2TT.

12. The image processing method of claim 8, wherein the changing of the phase of the target pixel includes changing a phase of the target pixel with respect to the second modulation frequency to be less than a phase of the first decision pixel and to be greater than a phase of the second decision pixel.

13. An image processing device comprising:
a decision pixel manager configured to detect a first decision pixel and a second decision pixel of which phase is less than a phase of the first decision pixel, based on phases of pixels included in a decision area corresponding to a defect candidate pixel with respect to a first modulation frequency of a sensing light source among the pixels;
a target pixel determiner configured to determine the defect candidate pixel as a target pixel, corresponding to that a first phase of the first decision pixel is less than a second phase of the second decision pixel, based on the first phase and the second phase with respect to a second modulation frequency of the sensing light source; and
a phase corrector configured to change a phase of the target pixel, based on a difference between the first phase and the second phase,
wherein the second modulation frequency is greater than the first modulation frequency, and
wherein phases of the first decision pixel and the second decision pixel vary according to a modulation frequency of the sensing light source.

14. The image processing device of claim 13, wherein the decision pixel manager determines, as the first decision pixel and the second decision pixel, pixels having the largest phase difference with respect to the first modulation frequency among the pixels.

15. The image processing device of claim 14, wherein the decision pixel manager determines, as the first decision pixel, a pixel of which phase is largest among the pixels, and determines, as the second decision pixel, a pixel of which phase is smallest among the pixels.

16. The image processing device of claim 13, wherein the target pixel determiner determines the defect candidate pixel as the target pixel, corresponding to that a magnitude of a phase difference between the first decision pixel and the second decision pixel is less than a half cycle, and wherein the half cycle represents TT which is a half of $2\pi$, corresponding to that phases of pixels displayed on a complex plane are less than $2\pi$.

17. The image processing device of claim 13, wherein the phase corrector changes a phase of the target pixel with respect to the second modulation frequency to be less than the first phase and to be greater than the second phase.

18. The image processing device of claim 13, wherein the phase corrector calculates a corrected phase, based on the difference between the first phase and the second phase, and increases the phase of the target pixel by the corrected phase.

* * * * *